United States Patent
Kikuchi et al.

(10) Patent No.: US 12,229,853 B2
(45) Date of Patent: Feb. 18, 2025

(54) IMAGE TRANSMISSION SYSTEM AND IMAGE TRANSMISSION METHOD

(71) Applicant: TOYOTA JIDOSHA KABUSHIKI KAISHA, Toyota (JP)

(72) Inventors: Daisuke Kikuchi, Yokohama (JP); Wataru Kaku, Musashino (JP); Aiko Sawado, Setagaya-ku (JP); Mina Funazukuri, Sumida-ku (JP); Masayuki Shimizu, Shinjuku-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/335,735

(22) Filed: Jun. 15, 2023

(65) Prior Publication Data

US 2024/0037807 A1 Feb. 1, 2024

(51) Int. Cl.
| | | |
|---|---|---|
| *G06T 11/00* | (2006.01) | |
| *G06F 3/01* | (2006.01) | |
| *G09G 3/00* | (2006.01) | |
| *H04W 88/02* | (2009.01) | |

(52) U.S. Cl.
CPC ............. *G06T 11/00* (2013.01); *G06F 3/011* (2013.01); *G09G 3/002* (2013.01); *G09G 2354/00* (2013.01); *H04W 88/02* (2013.01)

(58) Field of Classification Search
CPC ......... G06T 11/00; G06F 3/011; G09G 3/002; G09G 2354/00; H04W 88/02; H04N 13/167; H04N 13/194; H04N 13/275; H04N 13/363; H04N 2013/0096
See application file for complete search history.

(56) References Cited

U.S. PATENT DOCUMENTS

| | | | |
|---|---|---|---|
| 2010/0013828 A1* | 1/2010 | Castelli | ................. G06T 13/40 345/418 |
| 2012/0140147 A1 | 6/2012 | Satoh et al. | |
| 2013/0033643 A1* | 2/2013 | Kim | ................. H04N 21/42203 704/275 |
| 2016/0134938 A1* | 5/2016 | Miyazaki | ............... H04N 7/142 348/14.07 |

(Continued)

FOREIGN PATENT DOCUMENTS

| | | |
|---|---|---|
| JP | 2003-317168 A | 11/2003 |
| JP | 2004-348078 A | 12/2004 |

(Continued)

*Primary Examiner* — Amit Chatly
(74) *Attorney, Agent, or Firm* — Oliff PLC

(57) ABSTRACT

The image transmission system executes the following five steps. The first step is acquiring a first image by capturing a first person present in a first area by a first camera. The second step is generating a first person silhouette image representing a silhouette of the first person shown in the first image. The third step is projecting or displaying the first person silhouette image on a second object installed in a second area that is different from the first area. The fourth step is determining whether or not the first person performs a first trigger action based on the first image. Fifth step is when the first person performs the first trigger action, projecting or displaying a first person detailed image on the second object, wherein the first person detailed image is closer to a real image of the first person than the first person silhouette image is.

13 Claims, 13 Drawing Sheets

(56) References Cited

U.S. PATENT DOCUMENTS

2016/0364615 A1 12/2016 Sakoda et al.
2020/0275055 A1 8/2020 Koike et al.

FOREIGN PATENT DOCUMENTS

| JP | 2019-139169 A | 8/2019 |
| JP | 2021-027384 A | 2/2021 |
| WO | 2011/043100 A1 | 4/2011 |
| WO | 2014/192552 A1 | 12/2014 |
| WO | 2015/136796 A1 | 9/2015 |
| WO | 2019/097802 A1 | 5/2019 |

* cited by examiner

IMAGE TRANSMISSION SYSTEM AND IMAGE TRANSMISSION METHOD

CROSS-REFERENCE TO RELATED APPLICATION

The present application claims priority under 35 U.S.C. § 119 to Japanese Patent Application No. 2022-118877, filed, Jul. 26 2022, the contents of which application are incorporated herein by reference in their entirety.

BACKGROUND

Field

The present disclosure relates to an image transmission system and an image transmission method.

Background Art

JP2003-317168 discloses an information collection method for collecting information about misconduct, tort, and the like in response to occurrence of crimes or accidents in a specific area using a network camera. In the information collection method disclosed in JP2003-317168, two or more network cameras are installed on a street of a shopping mall, inside a visual field determined for each camera is captured, and an image is stored. Then, a recorded image showing an entry route to or an exit route from a site where the misconduct or the tort is performed is selected, and the selected image is stored in a storage medium as image information. The storage medium is submitted to the police to help resolve the crimes or the accidents.

WO 2014/192552 discloses a display control device for enabling users who are simultaneously viewing a content to smoothly communicate with each other. Information of a certain user acquired by a camera, a microphone, or the like is output to another user, and the users can feel as if the users are enjoying viewing the content together.

In addition to the above-mentioned JP2003-317168 and WO 2014/192552, WO 2019/097802, JP2021-027384, WO 2011/043100, and JP2004-348078 can be exemplified as documents showing the technical level in the technical field of the present disclosure at the time of filing.

SUMMARY

It is considered that a camera or a display device connected to a network is used to improve a sense of connection or communication between a plurality of people. It is possible to give a sense of connection by projecting an image of a person present in a certain area onto another area using the camera or the display device connected to the network. However, when the image is projected, it is also important to consider privacy of the person whose image is acquired.

One object of the present disclosure is to provide a technique that makes it possible that a person in a certain area feels a sense of connection with a person in a different area and is given a sense of security and a sense of belonging while considering privacy of a person whose image is acquired.

A first aspect relates to an image transmission system. The image transmission system includes one or more processors.

The one or more processors are configured to execute:

acquiring a first image by capturing a first person present in a first area by a first camera;

generating a first person silhouette image representing a silhouette of the first person shown in the first image;

projecting or displaying the first person silhouette image on a second object installed in a second area that is different from the first area;

determining whether or not the first person performs a first trigger action based on the first image; and when the first person performs the first trigger action, projecting or displaying a first person detailed image on the second object, wherein the first person detailed image is closer to a real image of the first person than the first person silhouette image is.

A second aspect relates to an image transmission method. The image transmission method includes:

acquiring a first image by capturing a first person present in a first area by a first camera;

generating a first person silhouette image representing a silhouette of the first person shown in the first image;

projecting or displaying the first person silhouette image on a second object installed in a second area that is different from the first area;

determining whether or not the first person performs a first trigger action based on the first image; and when the first person performs the first trigger action, projecting or displaying a first person detailed image on the second object, wherein the first person detailed image is closer to a real image of the first person than the first person silhouette image is.

According to the technique of the present disclosure, it is possible to make a person in a certain area feel connection with a person in a different area and give a sense of security and a sense of belonging while considering privacy of a person whose image is acquired.

DETAILED DESCRIPTION

Embodiments of the present disclosure will be described with reference to the accompanying drawings.

1. Overview

Figure 1:
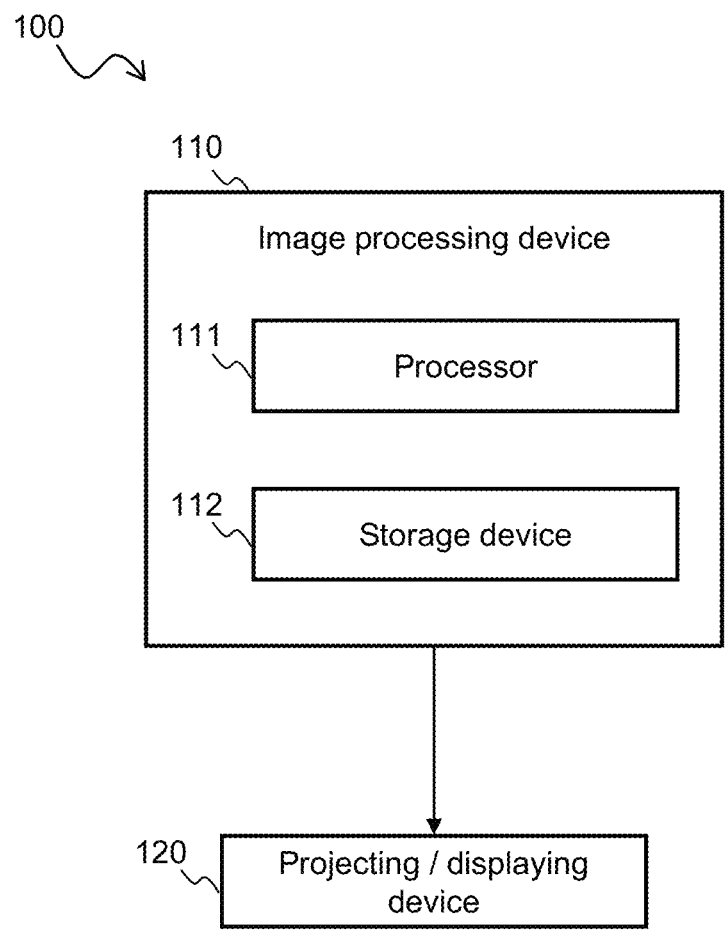
FIG. 1 is a block diagram showing a configuration example of an image transmission system according to the present embodiment.

FIG. 1 shows a minimal configuration of an image transmission system 100 according to the present embodiment. The image transmission system 100 includes an image processing device 110 and a projecting/displaying device 120.

The image processing device 110 generates various images to be projected or displayed by the projecting/displaying device 120 by processing an image acquired from a camera or the like or processing data acquired in advance. The generated various images include a real image of an actual person captured by the camera or the like, an image of a silhouette representing the actual person, an image of an avatar representing the actual person, an image of a silhouette representing an imaginary character, or the like. When generating the image representing the actual person, the image processing device 110 can generate the image from the captured image in real time so as to show how the person is moving in real time.

In this description, the real image of the actual person includes an image obtained by removing a background from an image captured by the camera or the like and cutting out only the person. The image of the silhouette representing the person or the character is an image in which the inside of a contour is filled with black so that only the contour of the person or the character can be seen. The image of the avatar representing the person is an image of a character obtained by processing the image of the person into an illustration style image or a 3D model style image to show features of the person while making unrequired parts ambiguous.

The projecting/displaying device 120 projects or displays the image generated by the image processing device 110. The projecting/displaying device 120 may be a projector or the like which projects the image on a projection surface such as a wall or a screen or may be a device which displays the image on a display.

The image processing device 110 includes one or more processors 111 (hereinafter, simply referred to as the processor 111) and one or more storage devices 112 (hereinafter, simply referred to as the storage device 112). The storage device 112 stores a plurality of programs executable by the processor 111 and various data related to the programs. The image processing device 110 can execute various processes including generating the image by the processor 111 executing the programs stored in the storage device 112.

It is considered that the image transmission system 100 is utilized in various situations.

2. First Example of Utilization

2-1. Configuration Example

Figure 2:
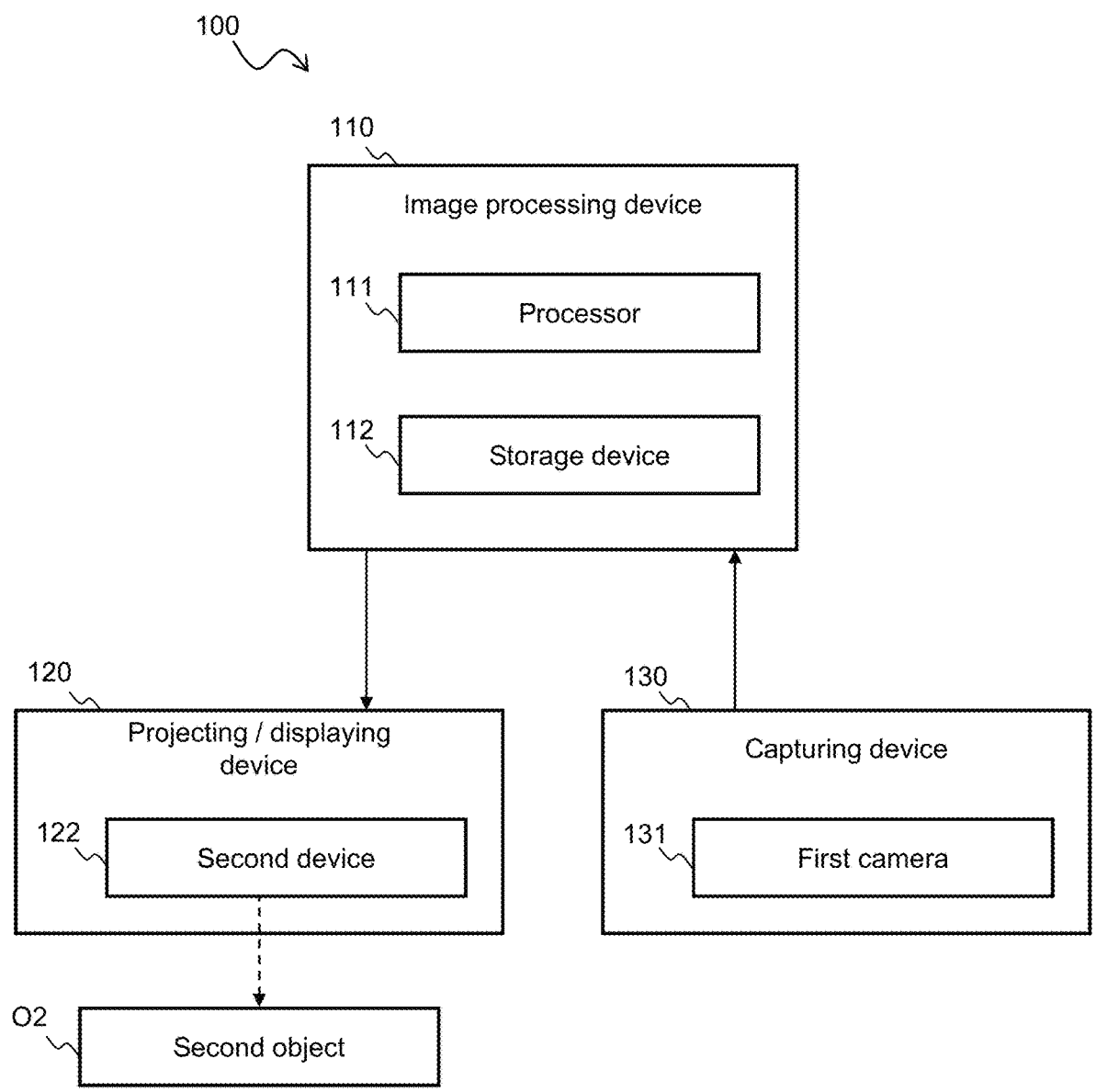
FIG. 2 is a block diagram showing another configuration example of the image transmission system according to the present embodiment.

FIG. 2 shows a configuration example of the image transmission system 100 according to the first example. The image transmission system 100 includes a capturing device 130 in addition to the image processing device 110 and the projecting/displaying device 120. The capturing device 130 is a device for capturing the image and includes a first camera 131. The image processing device 110 can acquire the image captured by the capturing device 130 and generate the image to be projected or displayed by the projecting/displaying device 120 based on the acquired image. The projecting/displaying device 120 includes a second device 122 for projecting or displaying the image on the second object O2.

In the first example, the image transmission system 100 is utilized so as to enable a person in a certain area to feel relationship with a person in a different area and improve relationship and communication between a plurality of people. Specifically, by the image transmission system 100 projecting or displaying the image, it is possible that existence of a first person present in a first area is conveyed to a second person present in a second area, which is different from the first area, and the second person feel relationship with the first person. Examples of the first area or the second area include a corridor (passage), a hall, and a room located inside or outside a building. The first area and the second area may be located in different buildings respectively or may be located in different places in the same building. Alternatively, either or both of the first area and the second area may be located outside a building.

2-2. Embodiment of Utilization (Basic Embodiment)

Figure 3:
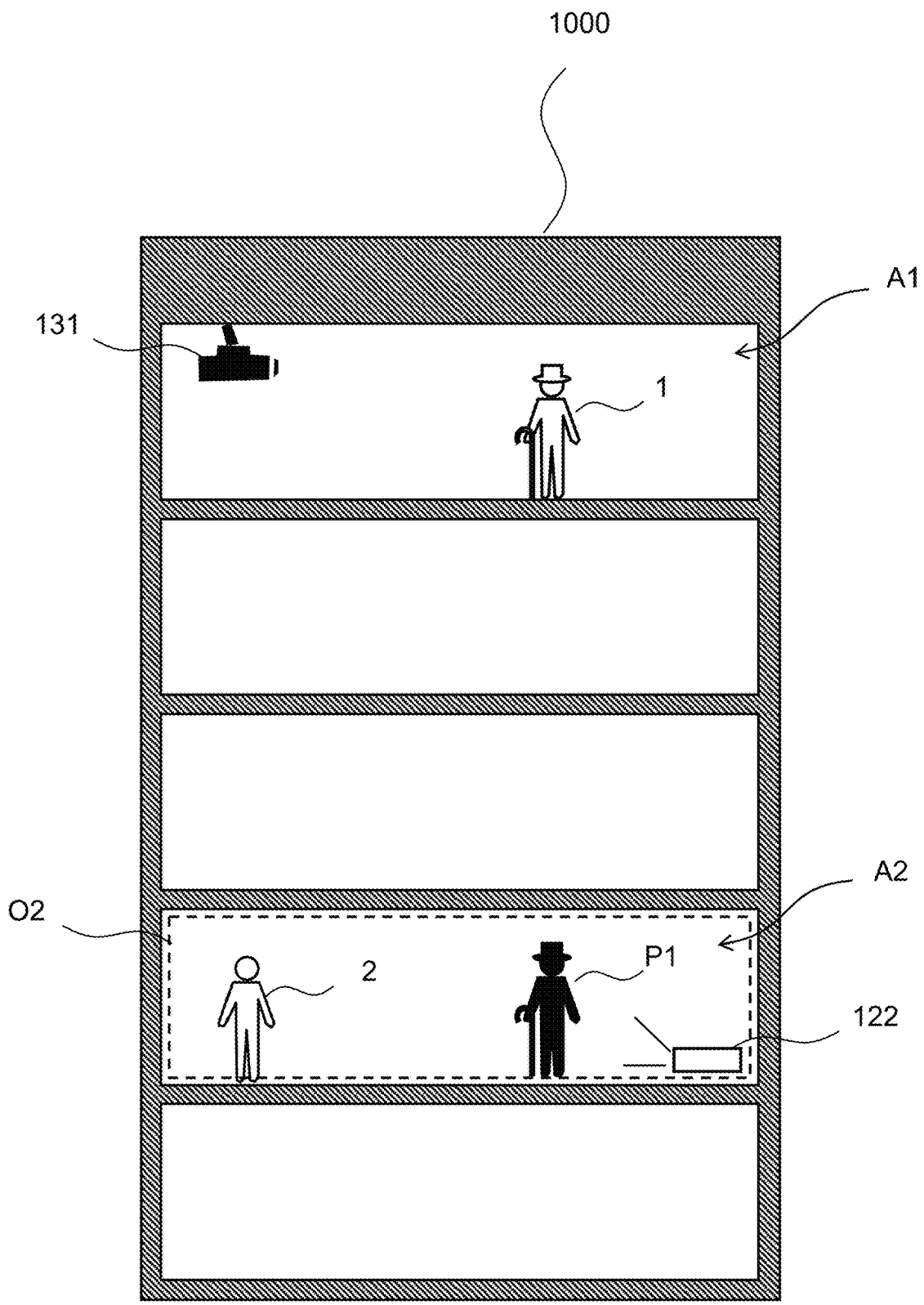
FIG. 3 is a schematic diagram showing an example of a scene in which the image transmission system according to the present embodiment is applied.

FIG. 3 shows a first person 1 present in a first area A1 and a second person 2 present in a second area A2. According to the example shown in FIG. 3, the first area A1 and the second area A2 are corridors located in different places in the same building 1000. The first camera 131 is installed in the first area A1 and can capture the first person 1 present in the first area A1. The second device 122 is installed in the second area A2 and can project the image on the second object O2 installed in the second area A2. In the example of FIG. 3, the second device 122 is a projecting device. The second object O2 may be a structure such as a wall, a column, a door, or the like located in the second area A2 or may be a screen or the like installed exclusively for projection of the image.

Hereinafter, the second device 122 is assumed to be the projecting device as an example. However, in the first example, the second device 122 may be a display device which displays the image onto the second object O2. In this case, the second object O2 may be a display screen or may be a part of the second device 122.

Further, although the first camera 131 is installed in the first area A1 in the example of FIG. 3, the first camera 131 is not necessarily installed in the first area A1. The first camera 131 may be installed outside the first area A1 as long as it can captured the first person 1 present in first area A1. Likewise, the second device 122 is not necessarily installed in the second area A2. The second device 122 may be installed inside or outside the second area A2 as long as it can project or display the image on the second object O2.

The image transmission system 100 executes an image transmission process while the first person 1 is present in the first area A1. The image transmission process is a process for conveying the existence of the first person 1 to the second person 2 using the image. The image transmission process is executed in the following flow. First, the first person 1 is captured by the first camera 131. By capturing the first person with the first camera 131, the processor 111 acquires a first image. Then, the processor 111 generates an image P1 representing the first person 1 in real time based on the first image. The generated image P1 is projected on the second object O2 by the second device 122 in real time.

By the image transmission process executed, even though the first person 1 and the second person 2 are in different areas, the second person 2 can feel the existence of the first person 1 as if they were in the same area. As a result, it is possible to give the second person 2 a sense of security and a sense of belonging.

However, when the existence of the first person 1 is conveyed to the second person 2, privacy of the first person 1 needs to be taken into consideration. The first person 1 does not necessarily want to disclose an image which allows the second person 2 to know a detail of the first person 1. In order to solve the problem of the privacy of the first person 1, a plurality of image transmission modes are set in the image transmission process. When the first person 1 first appears in the first area A1, a silhouette mode out of the image transmission modes starts. The silhouette mode is a mode in which the image P1 is made to be a first person silhouette image, which represents the silhouette of the first person 1. In FIG. 3, the first person silhouette image is projected as the image P1.

Since the image transmission mode starts from the silhouette mode, the detailed image of the first person 1 is not suddenly disclosed to the second person 2, and the first person 1 can enter the first area A1 or pass the first area A1 without anxiety about his/her privacy. On the other hand, the second person 2 can feel the existence of the first person 1 and can obtain a sense of security or a sense of belonging regardless of whether or not the image P1 is a silhouette image. In addition, as a result of making the image P1 be the image of the silhouette, the image P1 looks as if it had depth and showed a shadow of someone existing there, and the presence of the image P1 is emphasized. In this way, it is possible to give a sense of security and a sense of belonging to the second person 2 more effectively while considering the privacy of the first person 1.

As described above, it is appropriate that the silhouette mode is first set as the image transmission mode when the image transmission process starts. However, there is also a possibility that the first person 1 want to disclose a more detailed image of himself/herself to the second person 2. For example, there is a possibility that the first person 1 want to convey what he/she wear or what kind of facial expression he/she makes in addition to his/her motion shown by the silhouette to the second person 2. From the viewpoint of improving the communication and the relationship between the first person 1 and the second person 2, it is desirable that the more detailed image of the first person 1 is disclosed to the second person 2 if the first person 1 want that. Therefore, when it is determined that the first person 1 shows intention, the image transmission system 100 changes the image transmission mode from the silhouette mode to a live mode. The live mode is a mode in which the image P1 is made to be a first person detailed image. The first person detailed image is an image which is closer to the real image of the first person than the first person silhouette image is.

Figure 4:
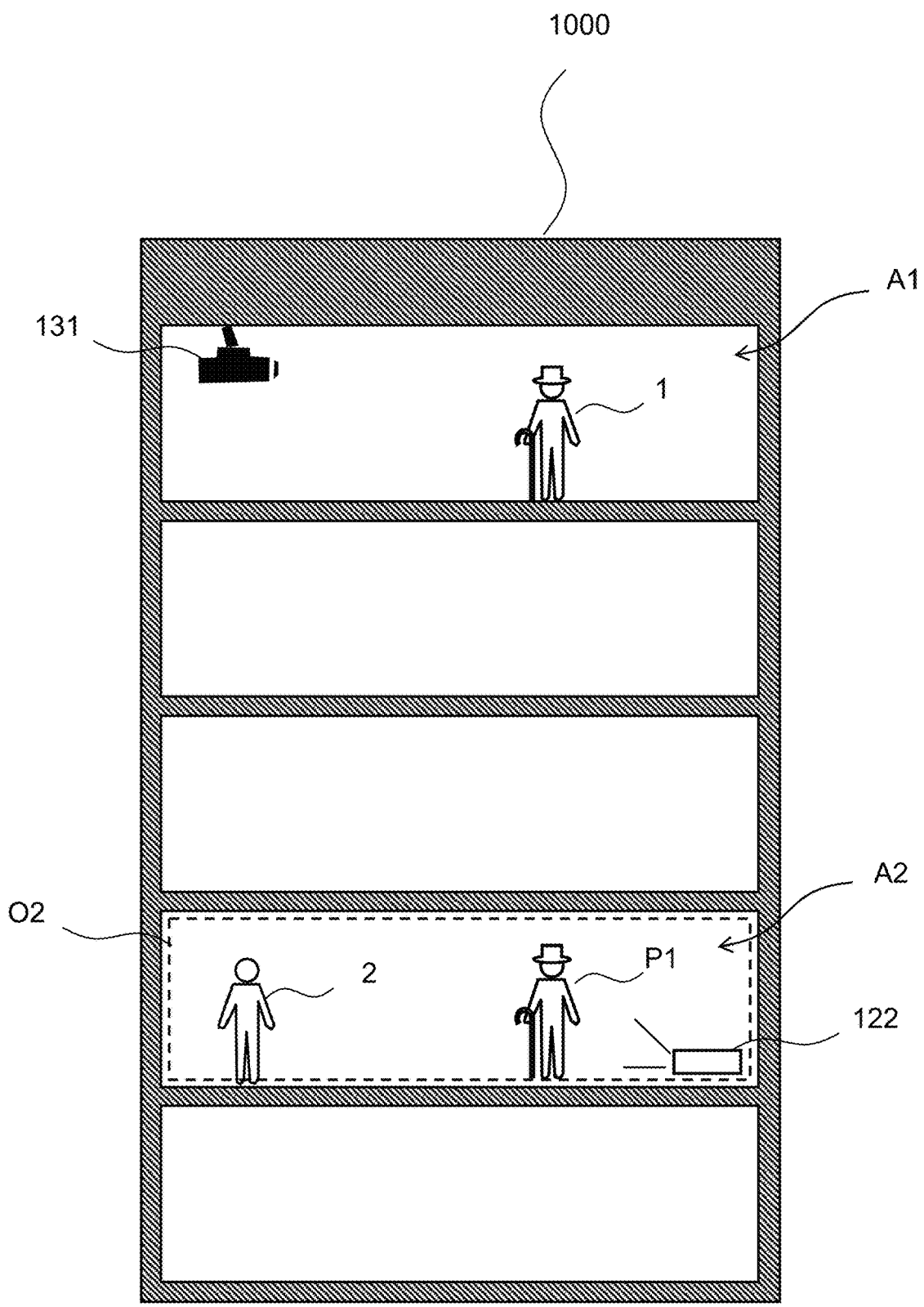
FIG. 4 is a schematic diagram showing an example of a first person detailed image.

In FIG. 4, the real image of the first person 1, which is an example of the first person detailed image, is projected on the second object O2 as the image P1. The first person detailed image may be the real image of the first person 1 as shown in FIG. 4 or may be the image of the avatar representing the first person 1. By the image P1 made to be the first person detailed image, the second person 2 can know a detail of the first person 1 such as what he/she wear or what kind of facial expression he/she makes, which is not shown by the first person silhouette image.

In order to change the image transmission mode into the live mode, intention of the first person 1 is required. To determine whether the first person 1 shows intention, a first trigger action performed by the first person 1 is used. When it is determined that the first person 1 performs the first trigger action, the image transmission system 100 changes the image transmission mode from the silhouette mode to the live mode. The first trigger action is set in advance by an administrator of the system or the like. Although any action can be set as the first trigger action, it is desirable to set an action which is not normally performed when the first person 1 is just passing the first area A1 so that it can be clarified that the first person 1 intendedly performs the first trigger action. For example, the first trigger action may be an action of waving both hands widely, jumping three times at the place, touching a wall with both hands twice, or the like.

It is preferable that the first trigger action is announced to the first person 1 in advance. Examples of how the first trigger action is announced to the first person 1 include posting an explanation of the first trigger action on a wall or at an entrance of the first area A1 and distributing an explanation to people who are expected to pass the first area A1 using programs in smartphones owned by the people respectively or the like. In this way, by specifying the first trigger action in advance for the first person 1, it is possible to further clarify that the first trigger action is intendedly performed by the first person 1.

As another example, the first trigger action may be able to be set by the first person 1. For example, an action chosen by the first person 1 may be registered in advance using programs in a smartphone or the like. Since the first trigger action is set by the first person 1 himself/herself, it is possible to reduce a risk that the first person 1 performs the first trigger action without intention and it is possible to further clarify whether the first trigger action is performed by the first person 1 intendedly.

2-3. Flowchart

Figure 5:
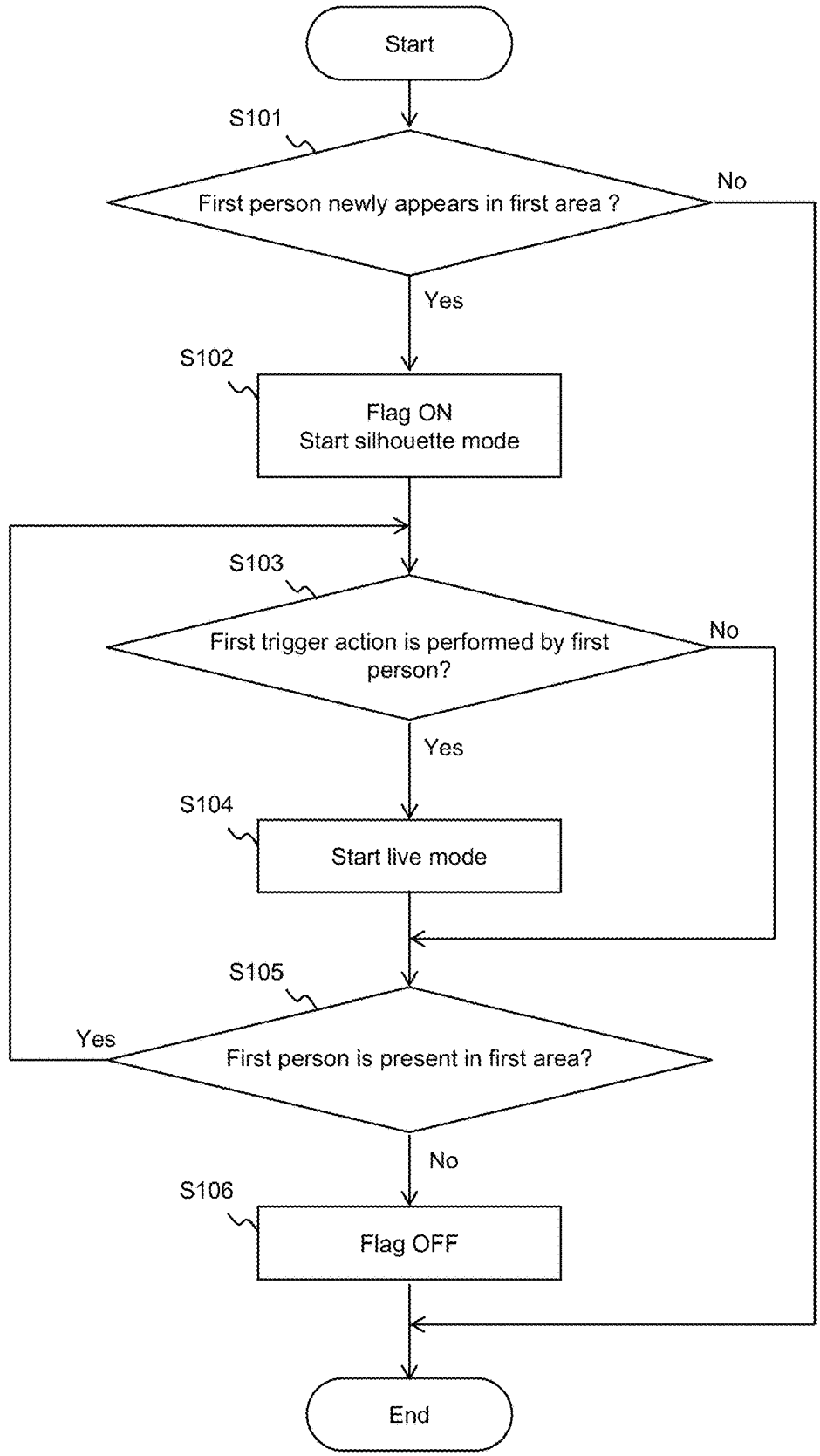
FIG. 5 is a flowchart showing an example of an image transmission mode setting process executed by the image transmission system according to the present embodiment.

Processing executed by the processor 111 in the first example includes an image transmission mode setting process and the image transmission process. The image transmission mode setting process and the image transmission process are executed by different programs respectively. FIG. 5 is a flowchart showing an example of the image transmission mode setting process. The image transmission mode setting process is repeatedly executed at a predetermined control cycle.

In Step S101, the processor 111 determines whether or not the first person 1 newly appears in the first area A1. The appearance of the first person 1 may be determined based on the first image or by a sensor such as a human sensor installed in first area A1. When it is determined that first person 1 newly appears in the first area A1 (Step S101; Yes), the processing proceeds to Step S102. When the first person 1 does not newly appears in the first area A1 (Step S101; No), the processing of the current cycle ends.

In Step S102, the processor 111 turns an image transmission processing flag ON. The image transmission processing flag is a flag for executing the image transmission process. In Step S102, the silhouette mode is set as the image transmission mode. When the silhouette mode is started, the processing proceeds to Step S103.

In Step S103, the processor 111 determines whether or not the first trigger action is performed by the first person 1. Whether or not the first trigger action is performed by the first person 1 is determined based on the first image. When it is determined that the first trigger action is performed by the first person 1 (Step S103; Yes), the processing proceeds to Step S104. When it is determined that the first trigger action is not performed by the first person 1 (Step S103; No), the processing proceeds to Step S105. In Step S103, the processor 111 may determine that the first trigger action is performed only when it is determined that the first trigger action is intendedly performed by the first person 1 and may determine that the first trigger action is not performed when it is determined that the first trigger action is not intendedly performed by the first person 1.

In Step S104, the processor 111 starts the live mode. That is, the image transmission mode is changed from the silhouette mode to the live mode. After the live mode is started, the processing proceeds to Step S105. If the live mode is already set as the image transmission mode, the image transmission mode is not changed and the live mode is continued.

In Step S105, the processor 111 determines whether or not the first person 1 is present in the first area A1. Whether or not the first person 1 is present in the first area A1 may be determined based on the first image or based on information acquired from a sensor installed in the first area A1. When the first person 1 continues to be present in the first area A1 (Step S105; Yes), the processing returns to Step S103. When the first person 1 is no longer present in the first area A1 (Step S105; No), the processing proceeds to Step S106.

In Step S106, the processor 111 turns the image transmission processing flag OFF. When the image transmission processing flag is turned OFF, the image transmission process, which will be described later, is refrained from performed, and thus the projection of the image P1 on the second object O2 ends. After the image transmission processing flag is turned OFF, the processing of the current cycle ends. As a modification of the processing shown in FIG. 5, the processor 111 may not detect the first trigger action after the live mode starts. That is, the processor 111 may not detect the first trigger action after starting projecting or displaying the first person detailed image on the second object O2.

Figure 6:
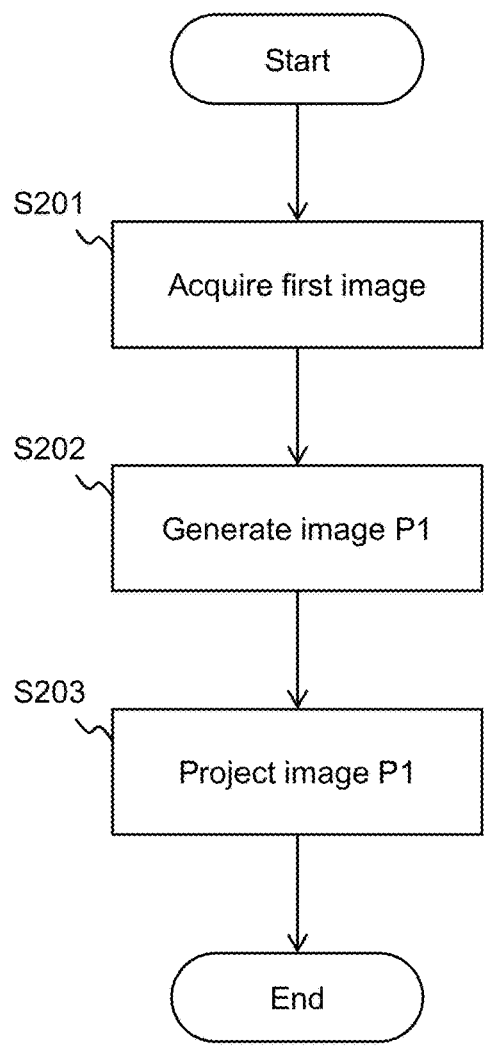
FIG. 6 is a flowchart showing an example of an image transmission process executed by the image transmission system according to the present embodiment.

FIG. 6 is a flowchart showing an example of the image transmission process executed by the processor 111. The image transmission process is repeatedly executed at a predetermined control cycle while the image transmission processing flag is ON. The control cycles of execution of the image transmission mode setting process and the image transmission process may be the same or may be different from each other.

In Step S201, the processor 111 acquires the first image. The first image can be acquired by capturing the first person 1 present in the first area A1 with the first camera 131. After the first image is acquired, the processing proceeds to Step S202.

In Step S202, the processor 111 generates the image P1 based on the first image. While the image transmission mode is the silhouette mode, the first person silhouette image is generated as the image P1 by extracting the contour of the first person 1 from the first image. While the image transmission mode is the live mode, the real image of the first person 1 is extracted from the first image to be used as the first image, or the image of the avatar is generated from the image of the first person included in the first image. The image P1 is generated in real time in response to the acquisition of the first image. When the image P1 is generated, the processing proceeds to Step S203.

In Step S203, the processor 111 projects the image P1 on the second object O2 by the second device 122. The image P1 is projected in real time in response to the generation of the image P1. After the image P1 is projected, the processing of the current cycle ends.

When a plurality of first people 1 are present in the first area A1, the respective processes for the first people 1 are not linked to each other. That is, the image transmission mode setting process and the image transmission process are executed for each first person 1. Therefore, there is a case that a plurality of images P1 for a plurality of the first people 1 projected on the second object O2 include both the first person silhouette images and the first person detailed images.

For example, it is assumed that after the first person 1-X enters the first area A1 and the image transmission processing flag is turned ON, the live mode is set as the image transmission mode in response to the first trigger action by the first person 1-X. After that, if the second first person 1-Y enters the first area A1, the image transmission processing flag for the first person 1-Y is newly turned ON. Then, the silhouette mode is first set as the image transmission mode for the first person 1-Y regardless of whether the first person 1-X performs the first trigger action and the live mode is set as the image transmission mode only after the first person 1-Y performs the first trigger action. In this way, by setting the image transmission mode for each first person 1 independently, even when a plurality of first people 1 are present in the first area, each first person 1 can control the amount of information disclosed to the second area A2 by his/her intention.

As described above, in the first example, the image P1 of the first person 1 present in the first area A1 is projected in the second area A2, which is different from the first area A1, by the image transmission system 100, and the second person 2 is given a sense of security and a sense of belonging. Since the image of the first person 1 displayed first is always made to be the image of the silhouette, it is possible to emphasize the presence of the image P1 while considering the privacy of the first person 1, and it is possible to effectively provide a sense of security and a sense of belonging for the second person 2. In addition, when the first person 1 shows intention, the image P1 is made to be the first person detailed image, and thus it is possible to realize smoother communication between the first person 1 and the second person 2.

2-4. Application

Hereinafter, two applications of the first example will be described. The first application and the second application can be combined.

Figure 7:
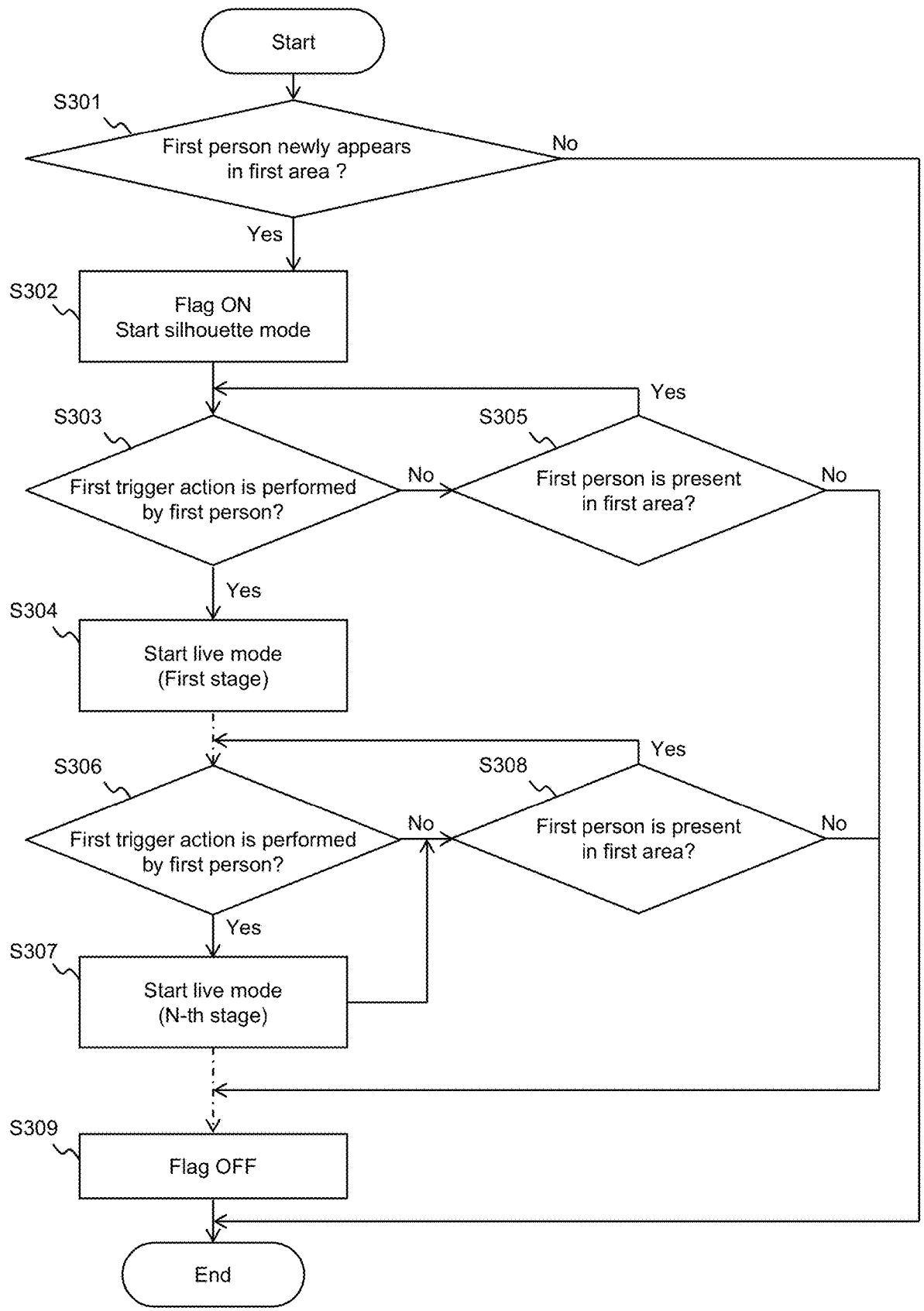
FIG. 7 is a flowchart showing another example of the image transmission mode setting process.

In the first application, the image transmission system 100 makes the image P1 closer to the real image of the first person 1 each time when the first person 1 performs the first trigger action. Specifically, a plurality of stages such as the first stage, the second stage, and the like are set in the live mode, and each time when the first person 1 performs the first trigger action, the stage of the live mode is changed from the current stage to the next upper stage. In each stage, how close the projected first person detailed image is to the first person 1 differs. FIG. 7 is a flowchart showing an example of the image transmission mode setting process executed by the processor 111 in the first application.

Processes of Step S301 to Step S303 are the same as the processes of Step S101 to Step S103 of FIG. 5. When it is determined that the first trigger action is performed by the first person 1 in Step S303, (Step S303; Yes), the processing proceeds to Step S304. When it is determined that the trigger action is not performed by the first person 1 (Step S303; No), the processing proceeds to Step S305.

In Step S305, it is determined whether or not the first person 1 is present in the first area A1. When the first person 1 continues to be present in the first area A1 (Step S305; Yes), the processing returns to Step S303. When the first person 1 is no longer present in the first area A1 (Step S305; No), the processing proceeds to Step S309.

In Step S304, the image transmission mode is changed from the silhouette mode to the live mode of the first stage. When the live mode of the first stage is started, the processing proceeds to Step S306.

Processes of Step S306 to Step S308 are almost the same as the processes of Step S303 to Step S305. However, which live mode is set in Step S307 is determined based on the current live mode. When the current live mode is the live mode of the (N minus one)-th stage, the live mode of the N-th stage is started in Step S307. When the current live mode is the live mode of the uppermost stage, the live mode of the same stage is continuously set as the image transmission mode.

After that, the processes of Step S306 to Step S308 are repeated until the first person 1 goes away from the first area A1. When it is determined that the first person 1 is not present in the first area A1 in Step S308 (Step S308; No), the processing proceeds to Step S309. In Step S309, similarly to Step S106 of FIG. 5, the image transmission processing flag is turned OFF by the processor 111. When the image transmission processing flag is turned OFF, the processing of the current cycle ends.

A plurality of stages in the live mode may be two stages. In this case, the first person detailed image may be made to be the image of the avatar representing the first person 1 in the first stage, and the first person detailed image may be made to be the real image of the first person 1 in the second stage. Alternatively, a plurality of stages of the live mode may include more than two stages. For example, in the live mode of the first stage, the first person detailed image may be made to be the image of the avatar in which the first person 1 is greatly abstracted without showing a fine part of the feature of the first person 1, and the first person detailed image may be changed to be the image showing the first person 1 in more detail each time when the stage is raised. Then, in the live mode of the uppermost stage, the first person detailed image may be made to be the real image of the first person 1.

In the first application, by setting a plurality of stages in the live mode, it is possible for the first person 1 to control the amount of information disclosed by the image P1, and it is possible to give more consideration to the privacy of the first person 1. For example, the first application is effective in a case where the first person 1 wants to convey a facial expression showing that he/she is laughing, angry, or the like, which is not conveyed by the first person silhouette image, to the second person 2, but does not want to allow the second person 2 to know a detailed feature such that he/she is clearly specified. Even in such a case, it is possible for the first person 1 to control how much abstract the image P1 by the number of times that the first person 1 performs the trigger action and disclose only information that the first person 1 wants to allow the second person 2 to know.

Figure 8:
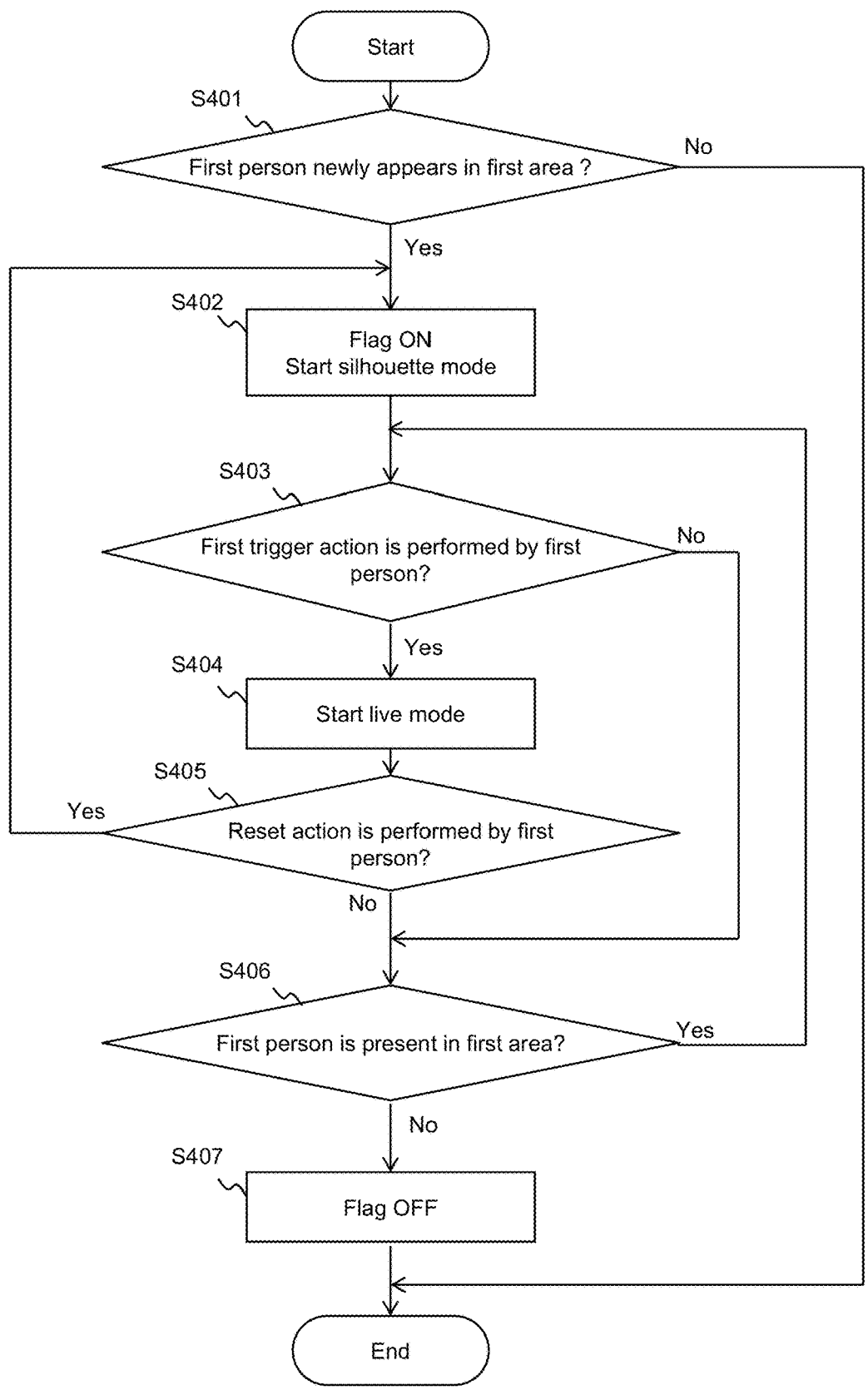
FIG. 8 is a flowchart showing another example of the image transmission mode setting process.

Next, the second application will be described. In the second application, a reset action for restoring the image P1 to the first person silhouette image is set. FIG. 8 is a flowchart showing an example of the image transmission mode setting process according to the second application. Processes of Step S401 to Step S404 in the flowchart of FIG. 8 is the same as the processes of Step S101 to Step S104 of FIG. 5. In Step S402, if the image transmission processing flag is already turned ON, it is continued to be ON. After the live mode is started in Step S404, the processing proceeds to Step S405.

In Step S405, the processor 111 determines whether or not the reset action is performed by the first person 1. The reset action is an action for restoring the image transmission mode to the silhouette mode after the live mode is set as the image transmission mode. Whether the reset action is performed by the first person 1 is determined based on the first image. When it is determined that the reset action is performed by the first person 1 (Step S405; Yes), the processing returns to Step S402. When it is determined that the reset action is not performed by the first person 1 (Step S405; No), the processing proceeds to Step S406. In Step S405, the processor 111 may determine that the reset action is performed only when the reset action is intendedly performed by the first person 1 and determine that the reset action is not performed when the reset action is determined not to be an intended action by the first person 1.

The reset action is set in advance by the administrator of the system or the like. Any action can be set as the reset action as long as it is different from the first trigger action. However, it is desirable to set an action which is not normally performed when the first person 1 is just passing the first area A1 so that it can be clarified that the reset action is performed by the first person 1 intendedly. Further, in order to clearly distinguish the reset action from the first trigger action, it is desirable that an action greatly different from the first trigger action is set. For example, an action of widely waving both hands may be set as the first trigger action and an action of highly jumping at the place may be set as the reset action.

Processes of Step S406 and Step S407 are the same as the processes of Step S105 and Step S106 of FIG. 5. After the image transmission processing flag is turned OFF in Step S407, the processing of the current cycle ends.

In the second application, by setting the reset action, the first person 1 can restore the image P1 to the first person silhouette image by his/her intention when the first person 1 erroneously performs the first trigger action even though he/she does not want to disclose the first person detailed image to the second person 2. In this way, it is possible to give more consideration to the privacy of the first person 1, and it is possible for the first person 1 to enhance a sense of security.

2-5. Transmission of Information in Two Directions

In the above description, transmission of information using the image in one direction from the first area A1 to the second area A2 is described. Such transmission of information using the image may be performed in two directions. That is, at the same time when information is transmitted from the first area A1 to the second area A2 using the image, information may also be transmitted from the second area A2 to the first area A1 using the image.

Figure 9:
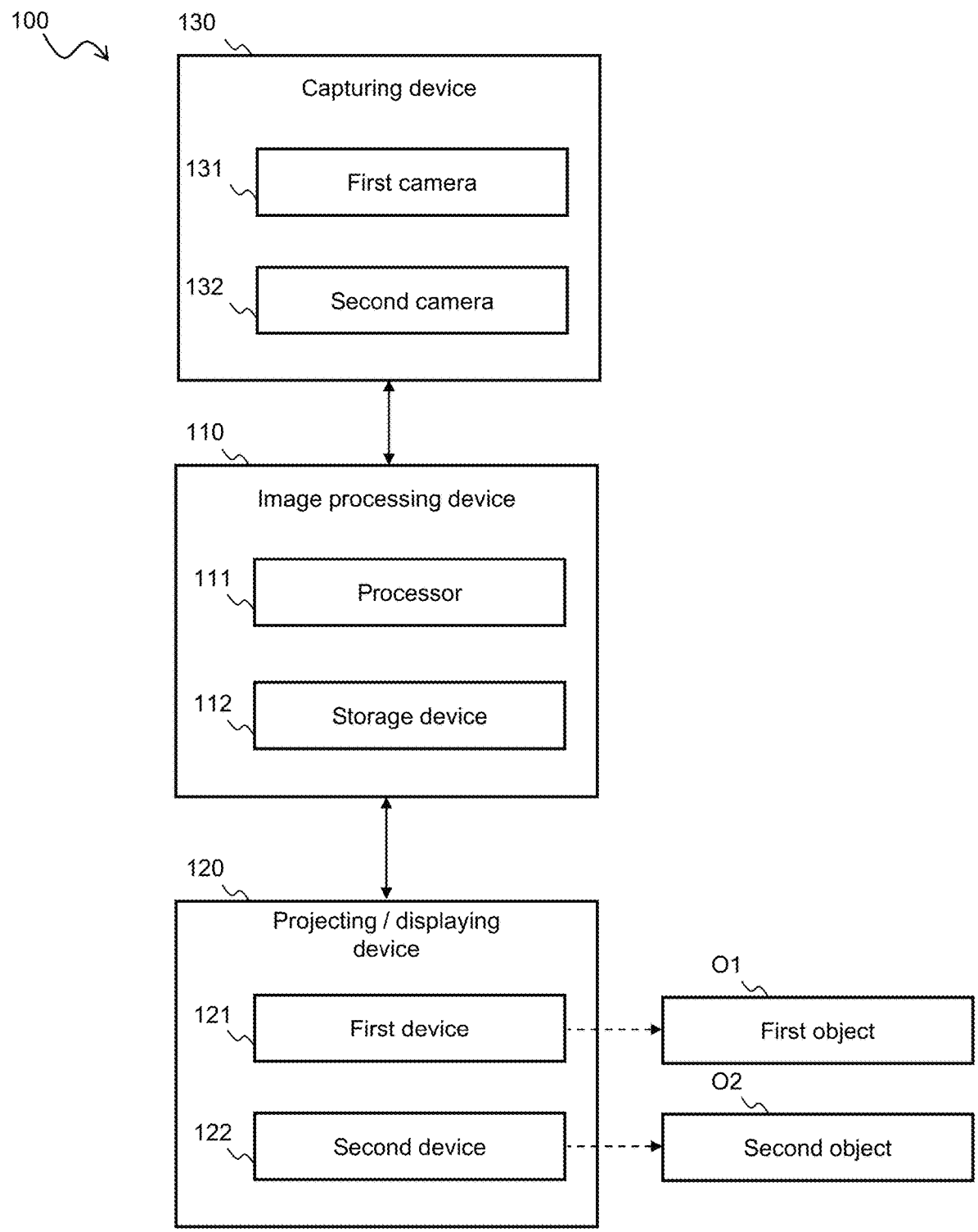
FIG. 9 is a block diagram showing a configuration example of the image transmission system according to the present embodiment.

FIG. 9 shows a configuration example of the image transmission system 100 in a case where information is transmitted in two directions. The capturing device 130 includes two cameras, the first camera 131 and a second camera 132. The projecting/displaying device 120 includes two devices, a first device 121 for projecting or displaying the image on a first object O1 and the second device 122 for projecting or displaying the image on the second object O2.

Figure 10:
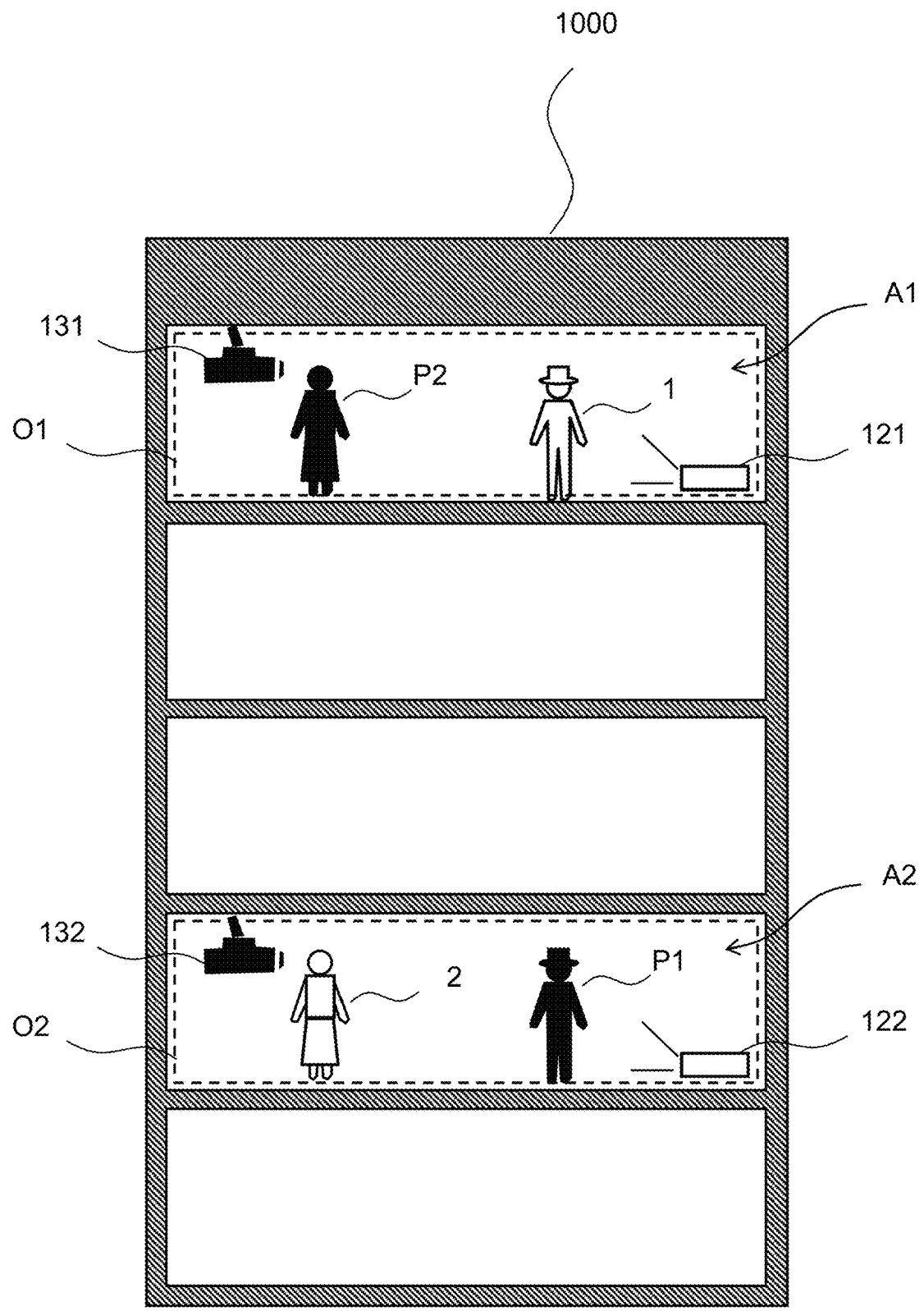
FIG. 10 is a schematic diagram showing an example of a scene in which the image transmission system according to the present embodiment is applied.

FIG. 10 shows an example of a scene in which information is transmitted in two directions. The first person 1 is present in the first area A1, and the second person 2 is present in the second area A2. Similarly to FIG. 4, the first person 1 is captured by the first camera 131, and the image P1 representing the first person 1 generated based on the captured image is projected on the second object O2. In addition, the first device 121 is installed in the first area A1, and the second camera 132 is installed in the second area A2 in FIG. 10. The second camera 132 captures the second person 2, and an image P2 representing the second person 2 generated based on the captured image is projected on the first object O1 installed in the first area A1.

When starting to be projected, the image P1 and the image P2 are made to be the first person silhouette image and a second person silhouette image, which represents the silhouette of the second person, respectively. When the first trigger action is performed by the first person 1, the live mode is started for the first person 1, and the image P1 is made to be the first person detailed image. In addition, when a second trigger action is performed by the second person 2, the live mode is started for the second person 2, and the image P2 is made to be a second person detailed image, which is closer to the real image of the second person than the second person silhouette image is. The second trigger action is set in advance by the administrator of the system or the like. The first trigger action and the second trigger action may be the same action or may be different actions. Since the first person 1 and the second person 2 can see the images of each other, interactive communication is achieved.

Similarly to the first object O1, the second object O2 may be a structure such as a wall, a column, a door, or the like in the second area A2 or may be a screen or the like installed exclusively for projecting the image. Although the second device 122 is assumed to be the projector as an example, it may be the display device which displays the image on the second object O2. In this case, the second object O2 may be the display screen and may be a part of the second device 122.

The second camera 132 is not necessarily installed in the second area A2, and it may be installed outside the second area A2 as long as it can capture the second person 2 present in the second area A2. Similarly, the second device 122 may be installed outside the second area A2 as long as it can project or display the image on the second object O2.

When information is transmitted in two directions, the image transmission mode for the first person 1 and the image transmission mode for the second person 2 may be set independently or set to be linked to each other. In a case where they are set independently, the processing related to the projection of the image P2 is realized by replacing the first area A1, the second area A2, the first person 1, the second person 2, the first camera 131, the second device 122, the second object O2, and the first trigger action in the above description with the second area A2, the first area A1, the second person 2, the first person 1, the second camera 132, the first device 121, the first object O1, and the second trigger action, respectively.

2-6. Linked Trigger Action

When information is transmitted in two directions, the image transmission mode for the first person 1 and the image transmission mode for the second person 2 may be linked to each other. In this case, trigger actions for changing the image transmission mode from the silhouette mode to the live mode can be made to be actions realized by cooperation between the first person 1 and the second person 2. As the trigger actions realized by the cooperation between the first person 1 and the second person 2, simultaneous or same trigger actions are assumed. "The simultaneous trigger actions are performed" means that the first trigger action is performed by the first person 1 and the second trigger action is performed by the second person 2 at the same time. Also in this case, the first trigger action and the second trigger action may be the same or may be different from each other. "The same trigger actions are performed" means that the first trigger action and the second trigger action are the same actions and both the first trigger action by the first person 1 and the second trigger action by the second person 2 are performed.

For example, simultaneous or same trigger action may be that the second person 2 touches the image P1 projected on the second object O2 at the same time when the first person 1 touches the image P2 projected on the first object O1. When the trigger actions are linked to each other, not only the actions just performed at the same time but also the actions which require the first person 1 and the second person 2 cooperate with each other can be set as the trigger actions. Accordingly, it is possible to give the first person 1 and the second person 2 a larger sense of connection between them or a larger sense of belonging.

Figure 11:
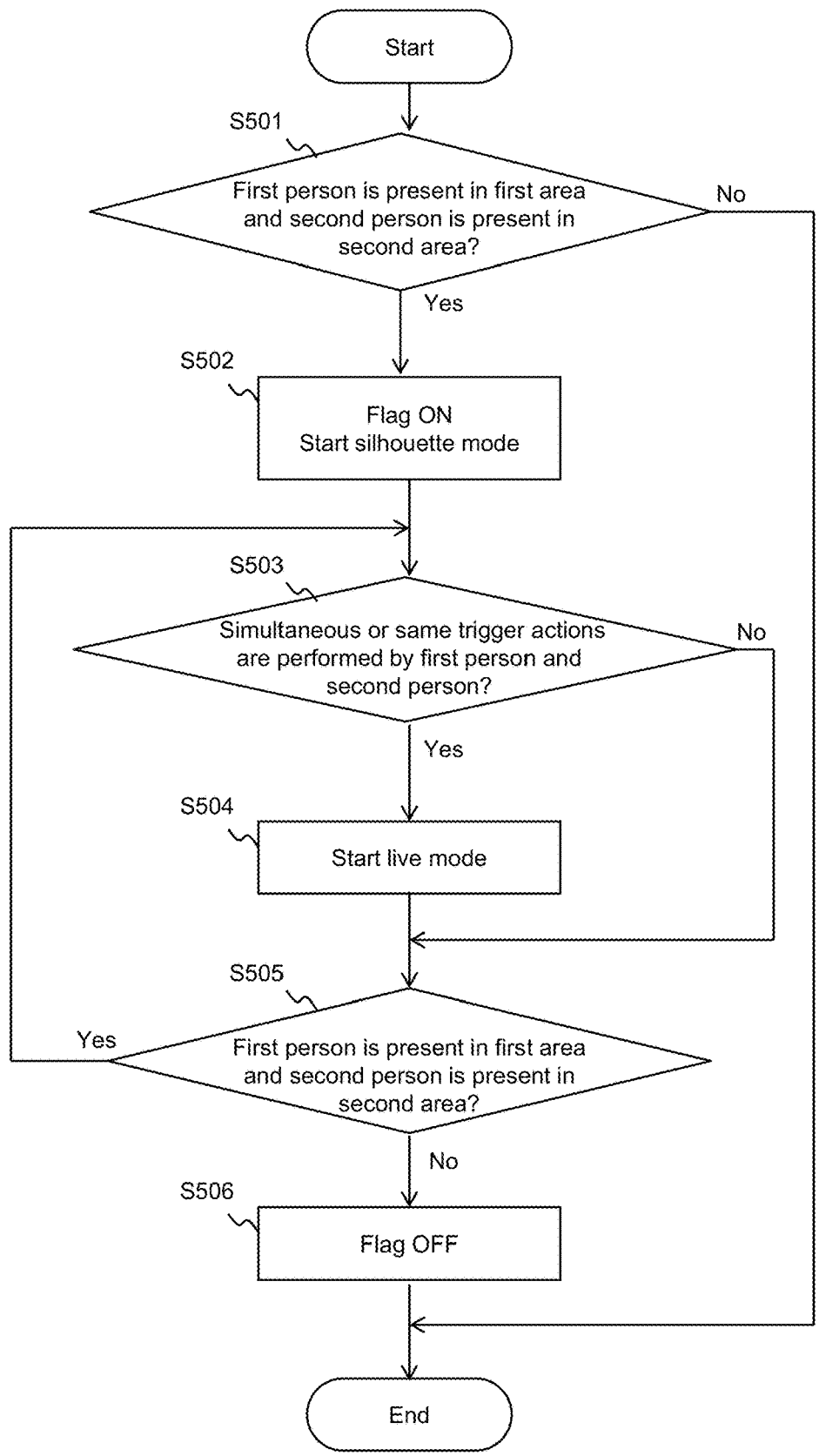
FIG. 11 is a flowchart showing an example of the image transmission mode setting process.

FIG. 11 is a flowchart showing an example of the image transmission mode setting process in a case where the trigger actions are linked.

In Step S501, the processor 111 determines whether or not both the first person 1 and the second person 2 are present, that is, the first person is present in the first area A1, and the second person is present in the second area A2. Whether or not the first person 1 and the second person 2 are present in each area may be determined based on the images captured by the first camera 131 and the second camera 132 or may be determined by a human sensor or the like installed in each area. When it is determined that both the first person 1 and the second person 2 are present (Step S501; Yes), the processing proceeds to Step S502. When both the first person 1 and the second person 2 are not present (Step S501; No), the processing of the current cycle ends.

In Step S502, the processor 111 turns the image transmission processing flag ON. In Step S502, the silhouette mode is set as the image transmission mode. After the silhouette mode is started, the processing proceeds to Step S503. In the processing shown in the flowchart of FIG. 11, turning ON/OFF of the image transmission processing flag for the first person 1 and turning ON/OFF of the image transmission processing flag for the second person 2 are linked to each other, and setting of the image transmission mode for the first person 1 and setting of the image transmission mode for the second person 2 are linked to each other.

In Step S503, the processor 111 determines whether or not the simultaneous or same trigger actions are performed. Whether the simultaneous or same trigger actions are performed is determined based on the first image and a second image. The second image is an image obtained by capturing the second person 2 with the second camera 132. When it is determined that the simultaneous or same trigger actions are performed (Step S503; Yes), the processing proceeds to Step S504. When it is determined that the simultaneous or same trigger actions are not performed (Step S503; No), the processing proceeds to Step S505. When determining whether the simultaneous trigger actions are performed in Step S503, the processor 111 may determine that the simultaneous trigger actions are performed if the time difference between timing at which the first trigger action is performed by the first person 1 and timing at which the second trigger action is performed by the second person 2 is shorter than a certain period.

In Step S504, the processor 111 starts the live mode. When the live mode is already set as the image transmission mode, the current mode is continued. After the live mode is started, the processing proceeds to Step S505.

In Step S505, the processor 111 determines whether or not the first person 1 is present in the first area A1 and the second person 2 is present in the second area A2. If both the first person 1 and the second person 2 continue to be present (Step S505; Yes), the processing returns to Step S503. When one or both of the first person 1 and the second person 2 are not present (Step S505; No), the processing proceeds to Step S506.

In Step S506, the processor 111 turns the image transmission processing flag OFF. By turning the image transmission processing flag OFF, the projection of the image P1 on the first object O1 and the projection of the image P2 on the second object O2 are finished. After the image transmission processing flag is turned OFF, the processing of the current cycle ends.

2-7. Other Examples

If the first area A1 and the second area A2 are far away from each other, there is a case that time difference occurs between the first area A1 and the second area A2. The image transmission system 100 may correspond to such time difference occurring between the two areas. That is, the image transmission system 100 may project the image P1 on the second object O2 at timing in which the time difference is taken into consideration instead of projecting it immediately after acquiring it by capturing the first area A1.

The image transmission system 100 may project the image P2 together with the image P1 on the second object O2 and project the image P1 together with the image P2 on the first object O1. Thus, interaction between the images can be generated. For example, the first person 1 and the second person 2 can feel connection between them more strongly, for example, by enjoying overlapping the images.

In addition, a shade of the image P1 may be able to change so that the shade of the image P1 becomes dark as the first person 1 and the first object O1 get closer. Likewise, a shade of the image P2 may be able to change so that the shade of the image P2 becomes dark as the second person 2 and the second object O2 get closer. As a result, it is possible to further emphasize the presence of the projected image P1 and image P2.

3. Second Example of Utilization

In the first example of utilization, it is considered to utilize the image transmission system 100 as a system for giving a person a sense of connection with another actual person. In the second example, it is considered to utilize the image transmission system 100 as a system for giving a person a sense of connection with a character which does not actually exist.

Figure 12:
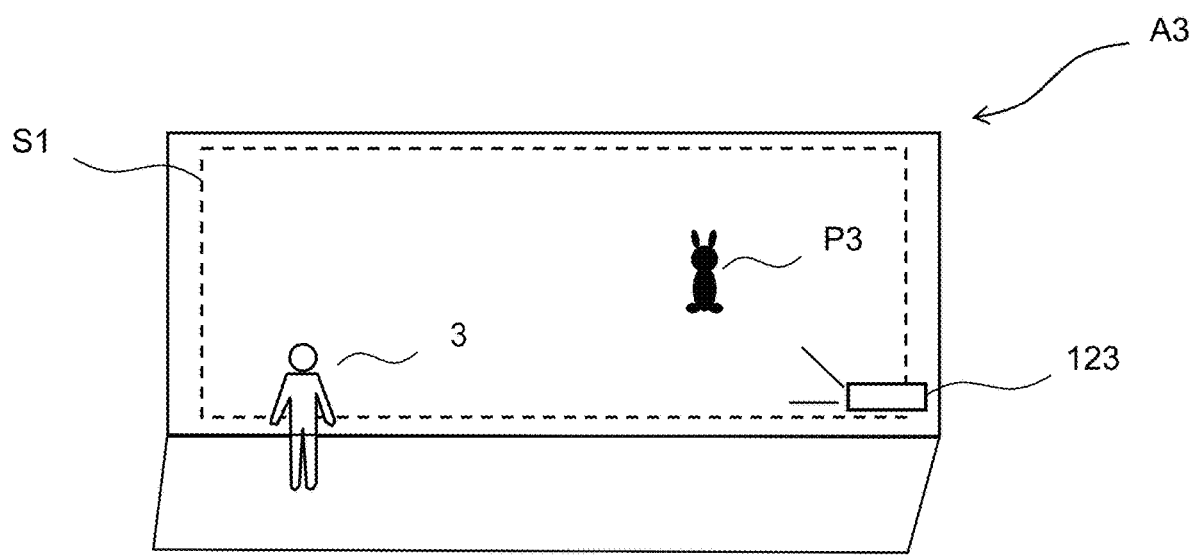
FIG. 12 is a schematic diagram showing an example of a scene in which the image transmission system according to the present embodiment is applied.

FIG. 12 shows an example of a scene in which the image transmission system 100 according to the second example is applied. In the second example, the projecting/displaying device 120 includes a projector 123, which projects the image on a projection surface S3 in a specific area A1. The projection surface S1 may be a structure such as a wall, a floor, a column, a door, or the like in the specific area A3 or may be a screen installed for projecting the image. Further, the projection surface S1 may be flat or may be curved.

Figure 13:
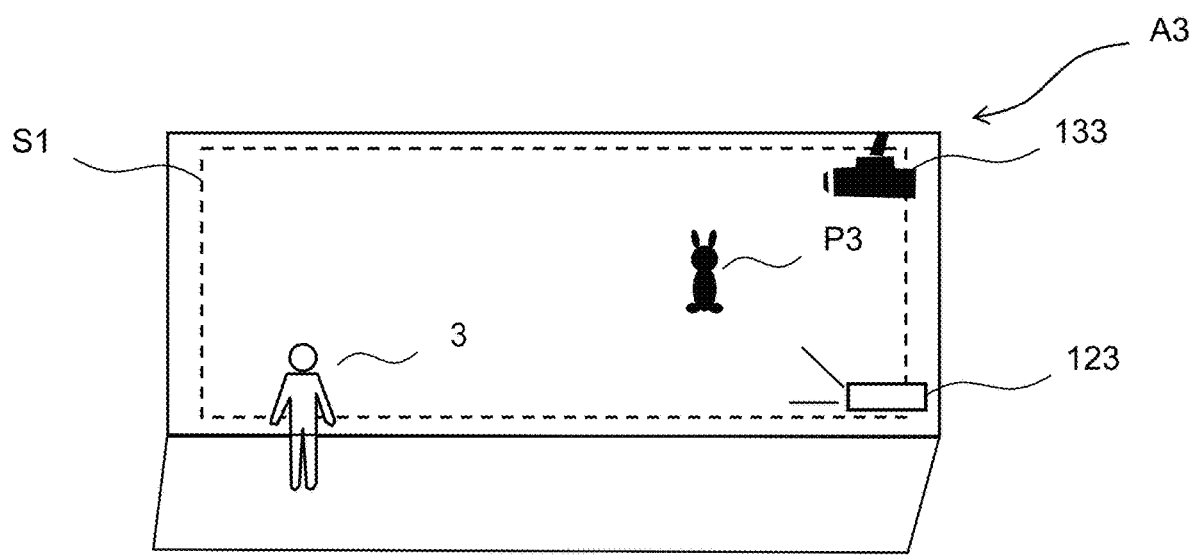
FIG. 13 is a schematic diagram showing another example of a scene in which the image transmission system according to the present embodiment is applied.

The image transmission system 100 (processor 111) generates an image P3 of the silhouette representing a character C3 and projects the image P3 on the projection surface S1 with the projector 123. The image P3 is projected in response to that the person 3 is present in the specific area A3. Any person can be the person 3 and the person 3 may be one person or a plurality of people. Whether the person 3 is present in the specific area A3 may be determined by, for example, a sensor such as a human sensor. In this case, when the sensor detects a person, it is determined that the person 3 is present in the specific area A3. The sensor may be a device included in the image transmission system 100. As another example, a third camera 133 may be installed in the specific area A3 as shown in FIG. 13, and it may be determined whether the person 3 is present in the specific area A3 based on information acquired by the third camera 133. In this case, the third camera 133 may be included in the capturing device 130.

The image transmission system 100 (processor 111) projects the image P3 representing the character C3 on the projection surface S1 in the specific area A3 in response to that at least the person 3 is present in the specific area A3. The image P3 is the image of the silhouette. Since the image P3 is the image of the silhouette, it is possible to effectively emphasize the presence of the character C3. In addition, since the image P3 is the image of the silhouette, it becomes easy to project the image using a structure already installed in the specific area A3 as the projection surface S1 instead using an exclusive screen. In a case where the already installed structure is used, it becomes difficult for the person 3 to guess where the image P3 will appear, and it is possible to increase a sense of presence when the person 3 encounters the character C3.

In the second example, the following embodiments are assumed. Each of the embodiments described below may be performed alone, or a plurality of the embodiments may be performed in combination.

In the first embodiment, the image transmission system 100 (processor 111) is refrain from projecting two or more images P3 representing one character C3 in the specific area A3. By the image P3 showing that only one character C3 exists, a sense of reality of the character C3 can be emphasized. In addition, rarity of the character C3 is also enhanced.

In the second embodiment, the image transmission system 100 (processor 111) specifies relationship between the person 3 and the character C3 and changes the behavior of the character C3 represented by the image P3 in accordance with the specified relationship. For example, the image transmission system 100 can recognize the people 3 with the third camera 133 and specify the relationship between each person 3 and the character C3. The specified relationship may be determined based on, for example, a parameter defined in advance for reflecting the number of times and period of time during which a certain person meets the character or may be determined based on a randomly determined element. Relationship information indicating the relationship between the person 3 and the character C3 is stored in the storage device 112. The processor 111 changes the behavior of the character C3 represented by the image P3 based on the relationship information. By changing the behavior of the character C3 in accordance with the relationship, it is possible to show as if the character has an emotion and to increase a sense of reality.

In the third embodiment, the image transmission system 100 (processor 111) starts projecting the image P3 on the condition that the person 3 performs a trigger action. The trigger action is set in advance by the administrator of the system or the like. Whether the trigger action is performed by the person 3 can be determined based on, for example, the image obtained by capturing the person 3 with the third camera 133. Unlike the first example and the second example of utilization, the trigger action is not announced to the person 3 in advance. That is, the image P3 starts to be projected only when the person 3 performs the trigger action by chance. By projecting the image P3 on the condition of such a trigger action, the rarity of the character is enhanced, and it is possible to give surprise and excitement to the person 3.

What is claimed is:

1. An image transmission system comprising one or more processors, the one or more processors being configured to execute:
    acquiring a first image by capturing a first person present in a first area by a first camera;
    generating a first person silhouette image representing a silhouette of the first person shown in the first image;
    projecting or displaying the first person silhouette image on a second object installed in a second area that is different from the first area;
    determining whether or not the first person performs a first trigger action based on the first image;
    when the first person performs the first trigger action, projecting or displaying a first person detailed image on the second object, the first person detailed image being closer to a real image of the first person than the first person silhouette image is; and
    not detecting the first trigger action after projecting or displaying the first person detailed image on the second object so that the first person detailed image is projected or displayed even after the first trigger action is no longer performed.

2. The image transmission system according to claim 1, wherein
    the first trigger action is an action announced to the first person in advance or an action set by the first person in advance.

3. The image transmission system according to claim 2, wherein
    the action announced to the first person in advance is shown in a smartphone of the first person.

4. The image transmission system according to claim 2, wherein
    the action set by the first person in advance is registered in a smartphone of the first person.

5. The image transmission system according to claim 1, wherein
    the first trigger action is waving both hands, jumping, or touching a wall.

6. The image transmission system according to claim 1, wherein
    the first person detailed image is the real image of the first person or an image of an avatar of the first person.

7. The image transmission system according to claim 2, wherein
    the first person detailed image is the real image of the first person or an image of an avatar of the first person.

8. The image transmission system according to claim 1, wherein
    the first person detailed image is an image of a character showing features of the first person while making unrequired parts ambiguous.

9. The image transmission system according to claim 1, wherein
    the second object is a display, a structure, or a screen.

10. The image transmission system according to claim 1, wherein
    the one or more processors are configured to execute:
    determining the first person in the first area by the first image or a sensor provided in the first area.

11. The image transmission system according to claim 1, wherein
    the one or more processors are configured to execute:
    not detecting the first trigger action if the first person cannot be detected.

12. The image transmission system according to claim 1, wherein
    the one or more processors are configured to execute:
    ending projecting or displaying the first person detailed image if the first person cannot be detected after projecting or displaying the first person detailed image on the second object.

13. The image transmission system according to claim 1, wherein
    the one or more processors are configured to further execute:
    making the first person detailed image closer to the real image of the first person each time the first person performs the first trigger action.

* * * * *

UNITED STATES PATENT AND TRADEMARK OFFICE
CERTIFICATE OF CORRECTION

| | | |
|---|---|---|
| PATENT NO. | : 12,229,853 B2 | Page 1 of 1 |
| APPLICATION NO. | : 18/335735 | |
| DATED | : February 18, 2025 | |
| INVENTOR(S) | : Daisuke Kikuchi et al. | |

It is certified that error appears in the above-identified patent and that said Letters Patent is hereby corrected as shown below:

On the Title Page

After Item (65) Insert:
--(30) Foreign Application Priority Data
July 26, 2022 (JP)........................................2022-118877--

Signed and Sealed this
Eighth Day of April, 2025

Coke Morgan Stewart
*Acting Director of the United States Patent and Trademark Office*